(12) United States Patent
Besemer et al.

(10) Patent No.: US 9,390,005 B2
(45) Date of Patent: Jul. 12, 2016

(54) METHOD FOR READING A DATA BLOCK OF A NONVOLATILE MEMORY OF A CONTROL UNIT

(71) Applicants: Michael Besemer, Esslingen (DE); Thomas Munz, Esslingen (DE); Steffen Leipold, Goeppingen (DE)

(72) Inventors: Michael Besemer, Esslingen (DE); Thomas Munz, Esslingen (DE); Steffen Leipold, Goeppingen (DE)

(73) Assignee: ROBER BOSCH GMBH, Stuttgart (DE)

( * ) Notice: Subject to any disclaimer, the term of this patent is extended or adjusted under 35 U.S.C. 154(b) by 98 days.

(21) Appl. No.: 14/512,053

(22) Filed: Oct. 10, 2014

(65) Prior Publication Data

US 2015/0106552 A1    Apr. 16, 2015

(30) Foreign Application Priority Data

Oct. 11, 2013    (DE) .......................... 10 2013 220 513

(51) Int. Cl.
*G06F 12/00*    (2006.01)
*G06F 12/02*    (2006.01)
*G06F 12/08*    (2016.01)

(52) U.S. Cl.
CPC ........ *G06F 12/0246* (2013.01); *G06F 12/0833* (2013.01); *G06F 2212/222* (2013.01); *G06F 2212/7209* (2013.01)

(58) Field of Classification Search
CPC . G06F 12/0246; G06F 12/0833; G06F 17/30; G06F 17/30011; G06F 17/30864; G06F 17/3087; G06F 2212/222; G06F 2212/7209
See application file for complete search history.

(56) References Cited

U.S. PATENT DOCUMENTS

2011/0185112 A1*    7/2011    Goss ................... G06F 12/0246
                                                            711/103

* cited by examiner

*Primary Examiner* — John Lane
(74) *Attorney, Agent, or Firm* — Norton Rose Fulbright US LLP

(57) ABSTRACT

A method for reading a data block of a nonvolatile memory of a processing unit, the nonvolatile memory being subdivided into sectors; the sectors being written to consecutively in each case from a sector beginning to a sector end with different versions of different data blocks; a current version of a data block being written to a current position in a current sector; in a cache memory, for each data block, an entry being present that characterizes the respective data block.

11 Claims, 2 Drawing Sheets

METHOD FOR READING A DATA BLOCK OF A NONVOLATILE MEMORY OF A CONTROL UNIT

FIELD OF THE INVENTION

The present invention relates to a method for reading a data block of a nonvolatile memory of a control unit.

BACKGROUND INFORMATION

An EEPROM (electrically erasable, programmable, read-only memory) and a flash memory are nonvolatile memories, which are able to be used in microcontrollers of control units, computers or other electronic units. Data stored in these non-volatile memories are retained even when a power supply of the nonvolatile memory is interrupted. EEPROMs have some advantages over flash memories. In an EEPROM, individual bytes may be individually and flexibly written to and erased. In flash memories, on the other hand, data are only able to be erased as data blocks of several kilobytes. However, EEPROMs are more cost-intensive and require more space than flash memories. Therefore, one is able to take advantage of the possibility of emulating an EEPROM in a flash memory.

Such an emulated EEPROM may be divided into several sectors, a sector representing the smallest erasable unit. Each sector, in turn, may be subdivided into several pages, a page forming the smallest writable unit. Stored data blocks may occupy one or more pages, in this context. In this context, a sector is written to consecutively from the sector beginning to the sector end with data blocks, until the respective sector is full. When the respective sector is full, a subsequent sector is written to in analogous fashion.

Usually, several different data blocks are stored. One current version of a respective data block, in this context, is written to the next free page of the current sector. From each of the plurality of different data blocks there may thus exist different versions. Accordingly, in one sector, several versions of the same data block may be stored, the different versions of the data block having been set up at different times. A position of a particular version of a particular data block in one sector therefore indicates the current status of this version of the data block.

When the current, last stored version of a particular data block is being searched for, one may first search through a current, not yet fully written to sector from sector beginning to sector end. Since the position of a version of the particular data block in the sector indicates the current status, the sector always has to be searched from sector beginning to sector end. If the version searched for in the current sector is not found, a logically preceding sector is searched in the same manner. This process may be continued until the current version of the data block has been found. In some instances it may thus take a long time until the current version is found, since under certain circumstances a plurality of sectors has to be searched.

Furthermore, it is problematic in this context, that this search mode has to be repeated before each reading and writing process of a data block. If a particular data block is to be read in, its current version has to be searched for first. If a data block is to be written, for the protection of flash memories, also the current version of the data block is first searched for, since writing processes take place only in response to a change in the data block. Reading and writing processes of an emulated EEPROM therefore take up much time. This leads particularly to long runup times and bringing down times which should be avoided in particular with control units in motor vehicles, which often also fulfill safety-relevant functions.

It is therefore desirable to provide a possibility of reading in data blocks in a flash-emulated EEPROM rapidly and without great effort.

SUMMARY

According to the present invention, a method is provided for reading a data block of a nonvolatile (particularly an EEPROM) memory of a processing unit.

The method according to the present invention, in this context, is particularly suitable for flash memories or for EEPROM emulations, especially for EEPROM emulations in a flash memory. Moreover, the method according to the present invention is suitable for all types of processing units, particularly control units, and in particular for automotive applications. An application of the present invention is conceivable for all electronic units in which EEPROM memories are present.

A cache memory is used according to the present invention. A cache memory, in this context, is a collection of memory addresses, particularly in a RAM memory (of a microcontroller, for example) of the processing unit. In the cache memory, an entry is present for each data block that characterizes the respective data block. A corresponding entry characterizing a data block includes particularly an address of the current version of the respective data block. By address, in this context, one should particularly understand a memory address which indicates the exact memory position in the respective sector at which the current version is stored.

If the current version of a particular data block is required, the address of this current version is read in from the corresponding entry of the cache memory that characterizes this particular data block. Consequently, it is not necessary, each time the current version of a particular data block is needed, to search the individual sectors until the corresponding version is found. Reading and writing processes may thus be considerably speeded up, especially during an initialization of the processing unit. Running up and bringing down the processing unit may thus be considerably speeded up.

In order for the respective addresses to be present as entries in the cache memory, the cache memory first has to be set up. Within the meaning of the present invention, this setting up of the cache memory takes place not as a special procedure but automatically besides the normal operation of the processing unit. If the current version of a particular data block is needed, and the corresponding entry characterizing this data block does not include the address of the current version needed (but rather, for example, is empty or has an initialization value), the sectors are searched in the course of a search mode for this searched for current version of the particular data block, until the searched for current version has been found. As was explained at the outset, during the course of a search mode, each sector, in this context, is searched completely, that is, from a respective sector beginning to a respective sector end. This goes on until the searched for current version in a sector has been found.

The present invention makes use of the fact that, in the course of this search mode or this search, all the pages of the respective sectors are searched completely, from sector beginning to sector end, since the position of a version of a data block in the sector indicates the current status of this version. If in the course of this search mode a current version of another data block is found, the corresponding address of this version of the corresponding data block is entered as the entry characterizing this corresponding data block in the cache memory.

In this context, in particular it is first checked whether an address is already present as entry of this corresponding data block. If this is the case, and if the address already present relates to a less current, older version of this respective data block, the address already present is overwritten with the newly found address. However, if the address that is already present refers to a more current version than the version found, the address already present is retained as the entry. It is thereby ensured that the entry characterizing this corresponding data block always includes the address of the current version of the corresponding data block.

During the course of a conventional search mode, one would search exclusively for the searched-for current version of the particular data block, and all other data blocks would be ignored. By contrast to that, the method according to the present invention also takes into account all the current versions of all other data blocks found by chance during the course of the search mode. The cache memory is thus set up using these current versions of all data blocks found by chance. If one of these current versions of another data block is needed at a later time, it does not first have to be searched for. Using direct access to the respective address entered in the cache memory, the searched for current version may thus be read in at once. The address of this current version is thus, in particular, present a priori as an entry in the cache memory, before this current version is even needed.

The setup of the cache memory thus takes place in a controlled manner as well as saving time and resources. Under certain circumstances, the entire cache memory may already be set up after a complete search mode, in the course of the method according to the present invention.

If the current version of the particular data block is found in the course of the search mode, an address of the current version of the particular data block is advantageously entered in the cache memory as the entry characterizing the particular data block. Analogously to the above explanation, in this context, in particular, it is first checked whether an address is already present as entry of this corresponding data block. If an address already present relates to a less current, older version of this respective data block, the address already present is overwritten with the newly found address. If the address that is already present refers to a more current version than the version found, the address already present is retained as the entry.

During initialization of the processing unit, an initialization entry is preferably made in the cache memory as the entry characterizing the particular data block. For a later search process, this points to the fact that no address has been stored yet, and therefore the search process has to be carried out.

In one advantageous embodiment of the present invention, entries are made in the cache memory which characterize the individual sectors, in addition to the entries characterizing the individual data blocks. An entry characterizing a respective sector, in this instance, includes the information as to whether the respective sector has already been completely searched in the course of a search mode from the respective sector beginning to the respective sector end, especially since the last runup of the processing unit. This entry in the cache memory characterizing a respective sector is designated below as a respective sector status. Using the sector status, the search mode may be further shortened and simplified.

If a current version of a particular data block is searched and if the entry of the cache memory characterizing the particular data block includes no address, it is prevented, using the sector status, that the search mode has to be carried out again completely and has to be begun again at the beginning at the current sector. As a result, the sector status is advantageously read in first. Since the sector status tells which sectors have already been searched completely, these sectors are not searched any more in the course of the current search mode. Thus, only those sectors are searched which do not yet have a corresponding sector status and have not yet been searched. Consequently, it may be ensured that each sector is searched once, at most.

When a current version of the particular data block is stored in a current sector, the entry characterizing the particular data block is preferably updated. In order not to lose any data in this connection, the corresponding entry already present in the cache memory is first overwritten with a temporary pattern or entry (designated as temp-pattern in the following text). If the data of the corresponding data block are verified or if the current version of the particular data block are verified in the current sector, the entry in the cache memory characterizing the particular data block is overwritten with the address of this verified, current version of the particular data block. Consequently, it is ensured that, in the case of an interruption during a writing process and a later, at least partial initialization no data are lost or overwritten.

An entry of the cache memory that characterizes a data block is preferably first verified when this entry is supposed to be read in. If this entry includes an address, it is first verified whether this address is a valid address of a current version of this data block. If this is the case, the corresponding version is read in. If the address refers to an invalid data block, for example, a search mode is particularly carried out of a page corresponding to this address. If, for instance, the address refers not to a beginning of the version of the particular data block, the search mode is, in particular, carried out from the beginning, beginning at the current sector. If the characterizing entry of the cache memory includes the temp-pattern, the search mode is particularly carried out completely, once more. In this context, in particular, any existing sector status is ignored and the search mode is particularly begun from the beginning in the current sector. The entry of the cache memory characterizing this particular data block is thus newly set up.

A processing unit according to the present invention, such as a control unit of a motor vehicle, is equipped, particularly in a program technology manner, to carry out a method according to the present invention.

The implementation of the method in the form of software is also advantageous, since this causes particularly low costs, especially if an executing processing unit is also used for additional tasks and is therefore present anyway. Suitable data carriers for providing the computer program are, in particular, diskettes, hard disks, flash memories, EEPROM's, CD-ROM's, DVD's and other similar ones. A download of a program via computer networks (Internet, intranet, etc.) is also possible.

Further advantages and developments of the present invention are derived from the description and the accompanying drawings.

It is understood that the features mentioned above and the features yet to be described below may be used not only in the combination given in each case but also in other combinations or individually, without departing from the scope of the present invention.

The present invention is represented schematically in the drawings in light of exemplary embodiments and described in detail below with reference to the drawings.

DETAILED DESCRIPTION

Figure 1:
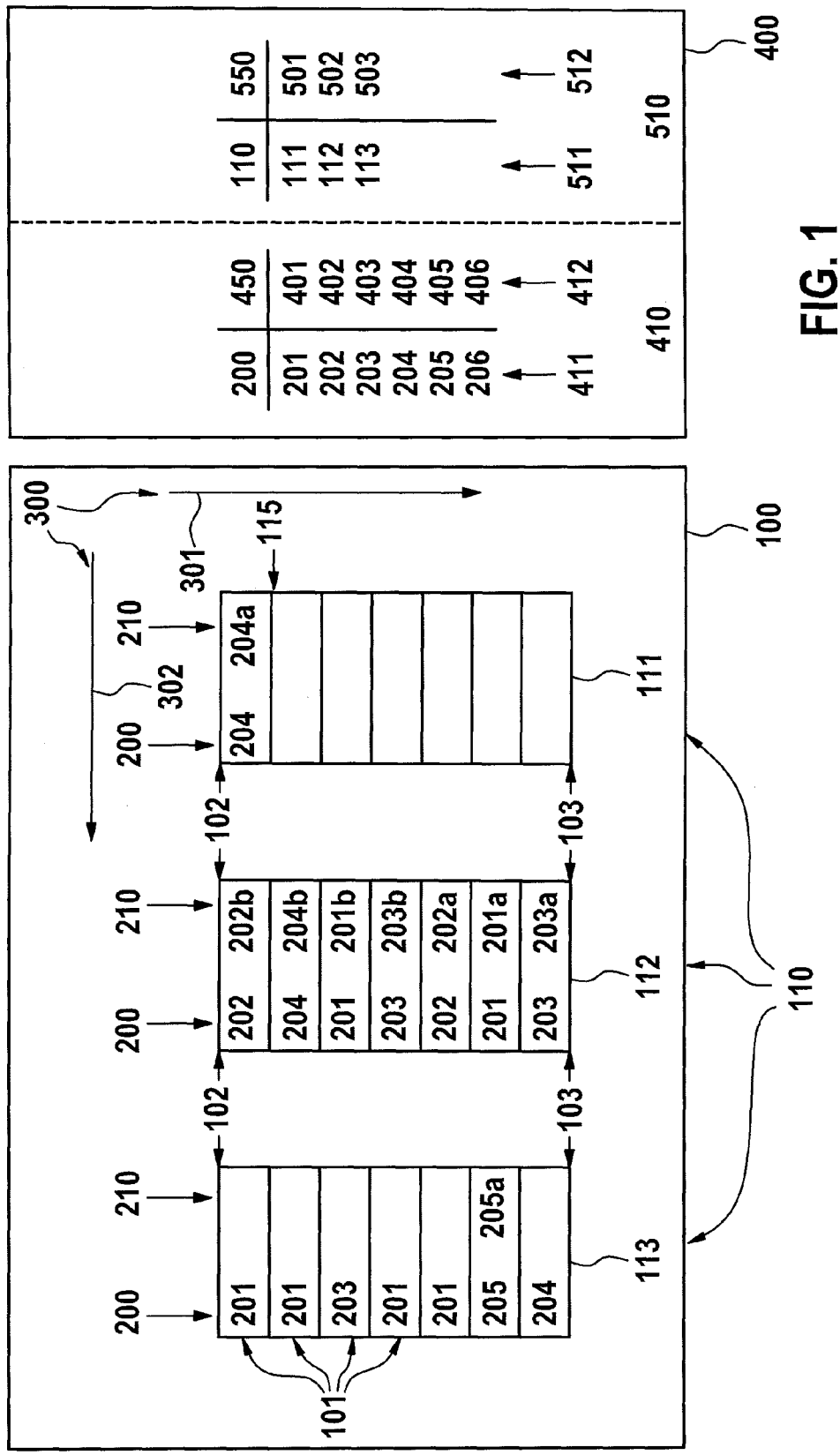
FIG. 1 shows schematically a nonvolatile memory having a plurality of sectors and a cache memory of a processing unit, which is suitable for carrying out a specific embodiment of a method according to the present invention.

FIG. 1 schematically shows a nonvolatile EEPROM memory of a processing unit and designated by 100. In this special example, the nonvolatile memory is developed as an emulation of an EEPROM within a flash memory. Emulated EEPROM 100 has several sectors 110. Three sectors 111, 112 and 113 are shown, for example, in FIG. 1. Each of sectors 110 is subdivided into individual pages 101. Pages 101 are the smallest units of the sectors able to be written to, in this instance. By contrast, sectors 110 are the smallest erasable units of emulated EEPROM 100.

Sectors 110 are now written to with different versions 210 of different data blocks 200, in a consecutive manner from a respective sector beginning 102 to a respective sector end 103. If a sector is occupied, a consecutively logical subsequent sector is written to from a respective sector beginning 102 to a respective sector end 103. In FIG. 1, sectors 113 and 112 are sectors that are fully written to. In this case, sector 113 was first fully written to, and then sector 112. Sector 111 is a current sector that is not yet completely written to. Reference numeral 115 in this case characterizes the current writing position, that is, the current page that is to be written to next.

Five different data blocks 201, 202, 203, 204 and 205 are shown, for example, in FIG. 1. Different versions 210 of individual data blocks 201, 202, 203, 204 and 205 are characterized, in this context, by letters a and b. The versions characterized by letter a represent the respectively current versions of the respective data blocks, in this connection. Version 201a, for example, represents the current version of data block 201. Version 201b represents a second-most current version of data block 201. This applies analogously to data block 202, 203 and 204. Only one version 205a is present for data block 205 in the example shown.

It should be noted that, for clarity's sake, in FIG. 1 each version 210 of a data block 200 fills up exactly one page 101. Different versions 210 of a data block 200 are, however, also able to fill up several pages, or fill up one page only partially.

In the course of a search mode 300, if searching is performed for current version 210 of a particular data block 200, first current sector 111 is searched from respective sector beginning 102 to respective sector end 103, which is indicated by reference numeral 301. If the current version is not found in current sector 111, logically preceding sector 112 is searched. If the current version is also not found in this sector 112, sector 113, logically preceding sector 112, is searched, etc., which is indicated by reference numeral 302.

In FIG. 1, besides emulated EEPROM 100, a cache memory 400 of the processing unit is shown. Cache memory 400 may be located within a RAM memory of the processing unit, for example. Two tables 410 and 510 are stored within cache memory 400. Table 410, in this instance, includes in a left column 411 identifiers 201 to 206 for the different data blocks 200. In the right column 412, Table 410 includes entries 401 to 406 of an entry 450 characterizing the respective data block.

Table 510 includes in a left column 511 identifiers 111, 112 and 113 for the different sectors 110. In the right column 512, Table 510 includes entries 501 to 503 of an entry 550 characterizing the respective sector.

Figure 2:
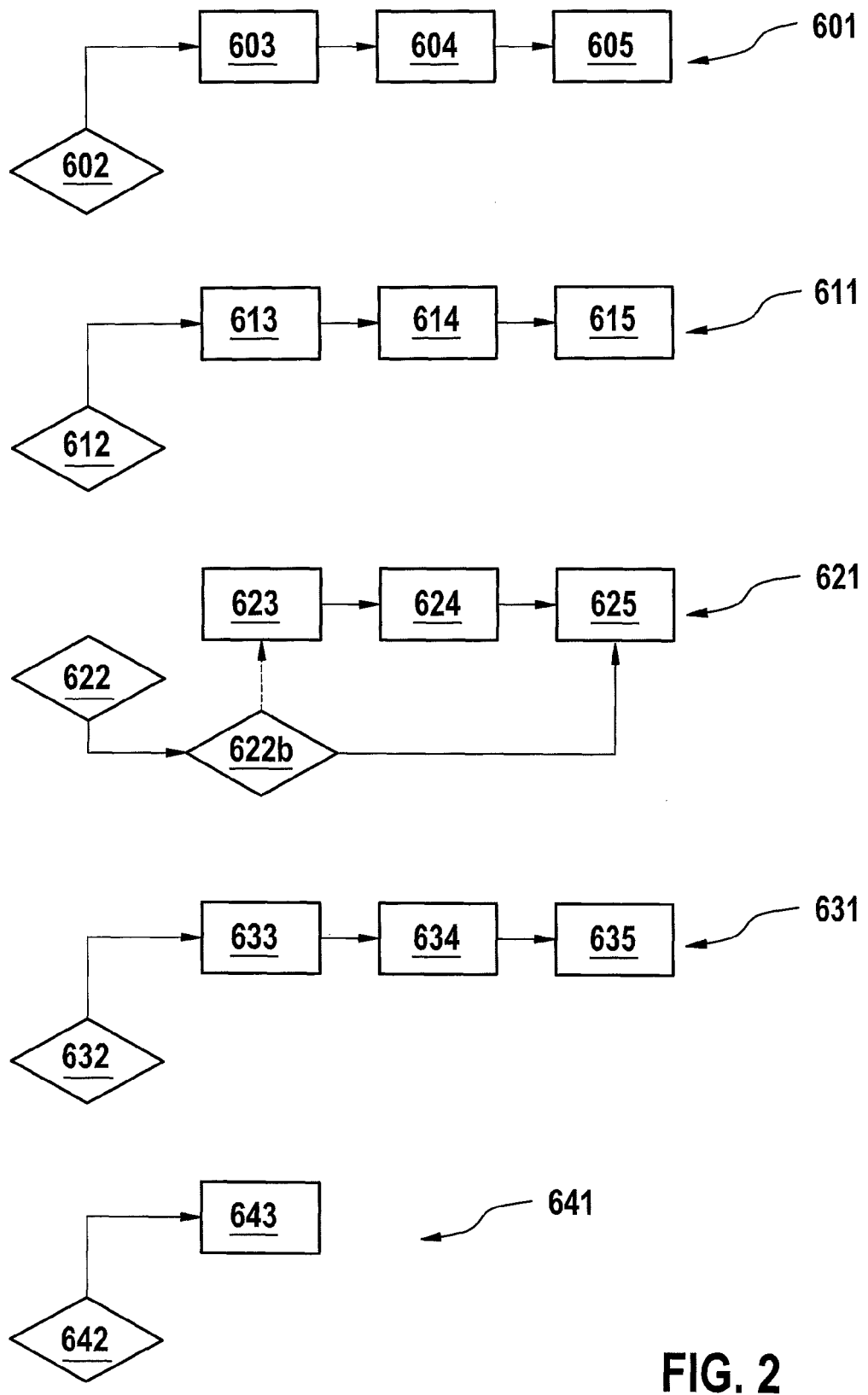
FIG. 2 shows schematically a specific embodiment of a method according to the present invention, as a block diagram.

In FIG. 2, a specific embodiment of the method according to the present invention is depicted as a block diagram. To explain the specific embodiment of the method according to the present invention, in the following text we shall assume the processing unit having emulated EEPROM 100 and cache memory 400 according to FIG. 1.

In a first pass 601, a search is to be made for current version 204a of data block 204. In step 602, in this instance, it is first checked whether entry 404, characterizing data block 204, of Table 410 of cache memory 400 includes an address of version 204a. In this example, this is not the case. In step 603, therefore, a search mode 300 is carried out. In this context, first entries 550 are read in, which characterize the individual sectors 110. In this example, none of sectors 110 has yet been searched, which is noted in individual entries 550. Therefore search mode 300 begins in current sector 111 at corresponding sector beginning 102 up to current page 115. In this special example, sector 111 includes only one data block, namely current version 204a being searched for. The corresponding address of current version 204a is entered as entry 404 of Table 410, characterizing data block 204. In step 604, it is entered as entry 501 of Table 510, characterizing sector 111, that sector 111 has been completely searched. In step 605, current version 204a is read in, in the end.

In a second pass 611, a search is to be made for current version 202a of data block 202. In step 612, it is checked whether entry 402, characterizing data block 202, of Table 410 of cache memory 400 includes an address of version 202a. In this example, this is not the case. In step 613, therefore, a search mode 300 is carried out.

In this case, entries 550 are first read in. Entry 501, characterizing sector 111, says that sector 111 has already been searched completely. Therefore, the search mode begins at logically preceding sector 112 at corresponding sector beginning 102 up to corresponding sector end 103.

In this context, first version 202b of data block 202 is found. The address of this version 202b is stored as entry 402 characterizing data block 202.

Subsequently, version 204b of data block 204 is found. It is checked whether corresponding entry 404 already includes an address of a current version of data block 204. As was described with reference to pass 601, entry 404 includes the address of current version 204a. Accordingly, entry 404 is retained and not changed.

Subsequently, version 201b is first found and thereafter version 203b. The addresses of these versions 201b and 203b are respectively stored as entry 401 and 403 characterizing data blocks 201 and 203.

Subsequently, version 202a of data block 202 is found. It is checked whether corresponding entry 402 already includes an address of a current version of data block 201. Since the address of entry 402 refers to previously found, less current version 202b, entry 402 is overwritten with the address of newly found, more current version 202a.

Analogously, versions 201a and 203a are subsequently found, and entries 401 and 403 are overwritten with the addresses of these current versions.

Search mode 300 has reached end 103 of sector 112 and is ended, since current version 202a of data block 202 has been found. In step 614, it is entered as entry 502 of Table 510, characterizing sector 112, that sector 112 has been completely searched. In step 615, current version 204a is read in, in the end.

In this special example, Table 410 of the cache memory is almost completely set up after only two passes and includes the addresses of the current versions of all data blocks, with the exception of data block 205.

In a third pass 621, a search is to be made for current version 203a of data block 203. In step 622, it is checked whether entry 403, characterizing data block 203, of Table 410 includes an address of version 203a. This is now the case, since this address was found in pass 611. In step 622, the address of entry 403 is verified. In this context, it is checked especially whether the address actually refers to current version 203a that was searched for. If this is the case, current version 203a is read in in step 625. If the address in step 622b cannot be verified, a search mode is carried out anew in step 623. This search mode is begun from the beginning, in this case, and ignores entries 550 of Table 510 that characterize sectors 110. Entry 403 is set up anew, in this context. Steps 623 and 624 run analogously to steps 613 and 614 of pass 611.

In a pass 631, a search is to be made for current version 205a of data block 205. In step 632, it is checked whether entry 405, characterizing data block 205, includes an address of version 205a. Since this is not the case, a search mode 300 is carried out in step 633. In this case, entries 550 are first read in. Since entries 551 and 552 say that sectors 111 and 112 have already been searched, only sector 113 is searched from sector beginning 102 to sector end 103. Thereby, first additional versions of data blocks 201 and 203 are found, and since these are not, however, current versions, the corresponding entries 401 and 403 are not overwritten. Current version 205a is found in the end, and its address is entered as entry 405 in Table 410. After sector 113 has been searched up to sector end 103, in step 634, it is entered as entry 503 of Table 510 characterizing sector 113, that sector 113 has been completely searched. In step 635, current version 205a is read in, in the end.

In a further pass 641, a search is to be made for the current version of a data block 206. In step 642, it is checked whether entry 406, characterizing data block 206, includes an address of the corresponding version. Since this is not the case, and since entries 550 say that all the sectors have already been completely searched, this means that no version of data block 206 is as yet present in nonvolatile memory 100. In step 643, therefore, no search mode has to be carried out.

What is claimed is:

1. A method for reading a data block of a nonvolatile memory of a processing unit, comprising:
   subdividing the nonvolatile memory into sectors;
   writing to the sectors consecutively in each case from a sector beginning to a sector end with different versions of different data blocks;
   writing a current version of a data block to a current position in a current sector, wherein for each data block, an entry is present in a cache memory that characterizes the respective data block;
   if a current version of a particular data block is being searched for, reading in an entry of the cache memory that characterizes the particular data block; and
   if the entry of the cache memory that characterizes the particular data block includes no address of the current version of the particular data block, performing a search mode in which:
      the sectors are searched, starting from the current sector, from a respective sector beginning to a respective sector end, until the current version of the particular data block is found in one sector, and
      if, during the search mode, a current version of one of the remaining data blocks is found, an address of the current version of the respective data block is entered in the cache memory as an entry characterizing the respective data block.

2. The method as recited in claim 1, wherein if, during the search mode, the current version of the remaining data blocks is found, an address of the current version of the particular data block is entered in the cache memory as the entry characterizing the particular data block.

3. The method as recited in claim 1, wherein during initialization of the processing unit, an initialization entry is made in the cache memory as the entry characterizing the particular data block.

4. The method as recited in claim 1, wherein an indication is stored in the cache memory, as an entry characterizing the individual sectors, whether the individual sectors have been searched from their respective sector beginning to their respective sector end.

5. The method as recited in claim 4, wherein in the search mode:
   the entries characterizing the individual sectors are read in in the cache memory, and
   only those sectors are searched from a respective sector beginning to a respective sector end which, according to the entries characterizing the individual sectors, have not been searched from their respective sector beginning to their respective sector end.

6. The method as recited in claim 1, wherein, if a current version of the particular data block is stored in a current sector:
   the entry in the cache memory characterizing the particular data block is set to a temporary pattern,
   the current version of the particular data block in the current sector is verified, and
   the entry in the cache memory that characterizes the particular data block is overwritten with the address of the current version of the particular data block.

7. The method as recited in claim 1, wherein an entry of the cache memory characterizing a data block is verified if the entry is to be read in.

8. The method as recited in claim 1, wherein the nonvolatile memory is an EEPROM memory.

9. A processing unit for carrying out a method for reading a data block of a nonvolatile memory of a processing unit, the method comprising:
   subdividing the nonvolatile memory into sectors;
   writing to the sectors consecutively in each case from a sector beginning to a sector end with different versions of different data blocks;
   writing a current version of a data block to a current position in a current sector, wherein for each data block, an entry is present in a cache memory that characterizes the respective data block;
   if a current version of a particular data block is being searched for, reading in an entry of the cache memory that characterizes the particular data block; and
   if the entry of the cache memory that characterizes the particular data block includes no address of the current version of the particular data block, performing a search mode in which:
      the sectors are searched, starting from the current sector, from a respective sector beginning to a respective sector end, until the current version of the particular data block is found in one sector, and
      if, during the search mode, a current version of one of the remaining data blocks is found, an address of the current version of the respective data block is entered in the cache memory as an entry characterizing the respective data block.

10. A computer program which causes a processing unit to carry out a method for reading a data block of a nonvolatile memory of a processing unit, the method comprising:

subdividing the nonvolatile memory into sectors;

writing to the sectors consecutively in each case from a sector beginning to a sector end with different versions of different data blocks;

writing a current version of a data block to a current position in a current sector, wherein for each data block, an entry is present in a cache memory that characterizes the respective data block;

if a current version of a particular data block is being searched for, reading in an entry of the cache memory that characterizes the particular data block; and if the entry of the cache memory that characterizes the particular data block includes no address of the current version of the particular data block, performing a search mode in which:

the sectors are searched, starting from the current sector, from a respective sector beginning to a respective sector end, until the current version of the particular data block is found in one sector, and if, during the search mode, a current version of one of the remaining data blocks is found, an address of the current version of the respective data block is entered in the cache memory as an entry characterizing the respective data block.

11. A machine-readable storage medium, having a computer program which causes a processing unit to carry out a method for reading a data block of a nonvolatile memory of a processing unit, the method comprising:

subdividing the nonvolatile memory into sectors;

writing to the sectors consecutively in each case from a sector beginning to a sector end with different versions of different data blocks;

writing a current version of a data block to a current position in a current sector, wherein for each data block, an entry is present in a cache memory that characterizes the respective data block;

if a current version of a particular data block is being searched for, reading in an entry of the cache memory that characterizes the particular data block; and if the entry of the cache memory that characterizes the particular data block includes no address of the current version of the particular data block, performing a search mode in which:

the sectors are searched, starting from the current sector, from a respective sector beginning to a respective sector end, until the current version of the particular data block is found in one sector, and if, during the search mode, a current version of one of the remaining data blocks is found, an address of the current version of the respective data block is entered in the cache memory as an entry characterizing the respective data block.

\* \* \* \* \*